United States Patent Office 3,539,619
Patented Nov. 10, 1970

3,539,619
1,1,3-TRIMETHYL-3-CYCLOHEXYLINDANE-4'-5-DICARBOXYLIC ACID
Alfred Steitz, Jr., Flossmoor, Ill., assignor to Standard Oil Company, Chicago, Ill., a corporation of Indiana
No Drawing. Filed June 21, 1967, Ser. No. 647,630
Int. Cl. C07c 63/00, 69/76
U.S. Cl. 260—475
7 Claims

ABSTRACT OF THE DISCLOSURE

New chemical compositions are 1,1,3-trimethyl-3-cyclohexylindane-4',5-dicarboxylic acid, its acid chloride and its lower alkyl esters.

My invention is a new organic acid and certain derivatives thereof. The new acid is 1,1,3-trimethyl-3-cyclohexylindane-4',5-dicarboxylic acid. This composition is represented by the structural formula:

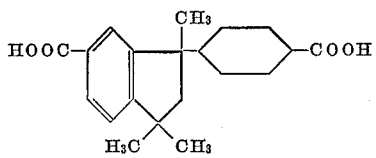

This acid has utility in the formation of polyamide compositions by reaction of the acid or the corresponding acid chloride with alpha, omega-diamine compounds such as hexamethylene diamine and diphenylene diamine, and other alkylene, arylene and bridged arylene diamines and their derivatives. This acid also has utility in the preparation of polyester compositions, such as by reaction with alpha, omega alkylene diols and similarly reactive derivatives of such diols. The polyamides and polyesters made from the acid or its derivatives by elimination reaction or trans-esterification reactions, can be used to make fibers, films or coatings similar to those known to workers in this art.

My novel acid is conveniently made of a cis/trans mixture of isomers. These can be separated into the individual compositions by crystallization techniques familiar to workers in this art. Such a cis/trans mixture was made by the following technique.

To a 200 g. sample of 1,1,3-trimethyl-3-phenylindane-4',5-dicarboxylic acid as the sodium salt in water, there was added a 10 g. sample of ruthenium-on-carbon hydrogenation catalyst containing 5 weight percent ruthenium. This was placed in a one gallon reaction bomb and stirred at about 180° C. under 1500 p.s.i.g. hydrogen pressure for 5½ hours. The reaction mixture was acidified and the free acid product recovered by filtration and water washing. The dried product was further purified by crystallization from ethanol. There was obtained 178 g., representing an 87 mol percent yield of 1,1,3-trimethyl-3-cyclohexylindane-4',5-dicarboxylic acid. This compound has a theoretical acid number of 340; the acid number found upon analysis was 339. The melting point of the acid was the range of 220–230° C. The theoretical carbon and hydrogen values are 72.8 and 7.88; the actual values obtained upon analysis were 72.14 and 8.10.

A portion of the acid product was converted to the methyl ester with diazomethane in order to make an ester gas chromatographic analysis and determine the distribution of cis and trans isomers. Conversion was accomplished in accordance with the procedure set forth in "J. Org. Chem.," 26, 935 (1961). When the esterified acid was analyzed, it was found to contain 1.2 percent monobasic acid, 52.2 percent of the trans isomer and 46.6 percent of the cis isomer.

The phenylindane dicarboxylic acid used as a starting material in the aforedescribed hydrogenation can be prepared by oxidation of the aryl methyl groups of 1,1,3,5-tetramethyl-3-(p-methylphenyl)-indane, by various oxidation techniques, exemplary of which is oxidation with chromic anhydride in accordance with the procedure set forth in "J. Am. Chem. Soc.," 70, 2127 (1950). The starting hydrocarbon can be prepared by dimerization of p-methyl-alpha-methylstyrene, which can itself be prepared by catalytic dehydrogenation of p-cymene or by an oxidative dehydrogenation of p-cymene in accordance with techniques known to workers in this art.

Lower alkyl esters of my invention can be prepared by adding 1,1,3 - trimethyl-3-cyclohexylindane-4',5-dicarboxylic acid to an excess of a lower alkanol containing one to ten carbon atoms, such as ethanol, isopropyl alcohol, n-propyl alcohol, iso-octyl alcohol, iso-decyl alcohol and the like, containing about one percent by weight of p-toluene sulfonic acid as catalyst together with a hydrocarbon, such as benzene, as a water entraining agent. The mixture is refluxed and water of esterification is removed by a moisture trap. Then the catalyst can be neutralized and excess hydrocarbon and alcohol removed by distillation from the ester product.

The acid chloride derivative of my novel acid can be prepared by refluxing the acid with excess thionyl chloride until the acid goes into solution, following which excess thionyl chloride is distilled off and the acid chloride recovered by vacuum distillation.

The cis and trans isomers of my novel acid can be separated by dissolving the mixture of isomers in hot ethanol as a saturated solution. To this is added water as an antisolvent and the mixture is cooled. Crystals of the cis isomer precipitate first. By repeated crystallizations, substantially all of the cis isomer can be removed from the solution, whereupon the solution can be further concentrated or evaporated for recovery of the trans isomer.

The lower alkyl esters of my acid, desirably containing 1-3 carbon atoms in the alkyl group, can be used in transesterification reactions to form polyesters. The acid chloride can be used for purposes described hereinabove relating to the acid.

Having thus described my invention, what I claim is:
1. A composition consisting of cis and trans isomers of an organic compound represented by the structural formula

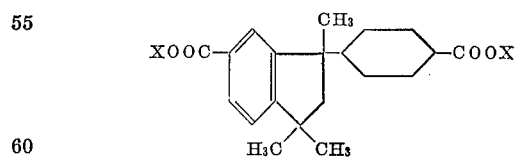

wherein X is selected from the group consisting of hydrogen and a lower alkyl radical containing 1–10 carbon atoms.

2. The composition of claim 1 which is the cis isomer, wherein X is hydrogen.

3. The composition of claim 1 which is the trans isomer, wherein X is hydrogen.

4. The composition of claim 1 which is the cis isomer, wherein X is a methyl radical.

5. The composition of claim 1 which is the trans isomer, wherein X is a methyl radical.

6. The composition of claim 1 which is the cis isomer, wherein X is an ethyl radical.

7. The composition of claim 1 which is the trans isomer, wherein X is an ethyl radical.

References Cited

UNITED STATES PATENTS 2,780,609    2/1957    Petropoulos _____ 260—475
3,385,905    5/1968    Smith et al. _____ 260—515

LORRAINE A. WEINBERGER, Primary Examiner

E. J. SKELLY, Assistant Examiner

U.S. Cl. X.R.

260—75, 78, 515, 544